(12) United States Patent
Poplawski et al.

(10) Patent No.: US 6,968,687 B1
(45) Date of Patent: Nov. 29, 2005

(54) HYDRAULIC APPARATUS WITH RETURN TO NEUTRAL MECHANISM

(75) Inventors: Herb Poplawski, Racine, WI (US); Michael W. Taylor, Sullivan, IL (US); Ryan S. Buescher, Neoga, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 10/897,241

(22) Filed: Jul. 22, 2004

Related U.S. Application Data

(63) Continuation of application No. 10/305,213, filed on Nov. 26, 2002, now Pat. No. 6,782,797, which is a continuation-in-part of application No. 09/789,419, filed on Feb. 20, 2001, now Pat. No. 6,487,857.

(51) Int. Cl.⁷ .............................................. F01B 13/04
(52) U.S. Cl. ........................... 60/487; 92/12.2; 92/505
(58) Field of Search .................. 92/12.1, 505; 60/484, 60/485, 486, 487; 74/839

(56) References Cited

U.S. PATENT DOCUMENTS

| | | | |
|---|---|---|---|
| 3,354,981 A | 11/1967 | Swanson et al. | |
| 3,541,878 A | 11/1970 | Hoffner | |
| 3,765,258 A | 10/1973 | Jespersen | |
| 3,792,744 A | 2/1974 | Gray | |
| 3,837,235 A | 9/1974 | Peterson | |
| 4,018,104 A | 4/1977 | Bland et al. | |
| 4,111,062 A | 9/1978 | Calligan | |
| 4,167,855 A | 9/1979 | Knapp | |
| 4,352,302 A | 10/1982 | McAllife et al. | |
| 4,375,771 A | 3/1983 | Kobelt | |
| 4,438,660 A | 3/1984 | Kittle | |
| 4,600,075 A | 7/1986 | Heidner et al. | |
| 4,606,428 A | 8/1986 | Giere | |
| 4,845,949 A | 7/1989 | Shivvers et al. | |
| 4,856,368 A | 8/1989 | Fujisaki et al. | |
| 4,870,820 A | 10/1989 | Nemoto | |
| 4,899,541 A | 2/1990 | Okada et al. | |
| 4,905,472 A | 3/1990 | Okada | |
| 4,914,907 A | 4/1990 | Okada | |
| 4,934,252 A | 6/1990 | Giere | |
| 4,955,249 A | 9/1990 | Wetor | |
| 4,986,073 A | 1/1991 | Okada | |
| 5,042,252 A | 8/1991 | Havens et al. | |
| 5,044,478 A | 9/1991 | Kaesgen et al. | |
| 5,074,195 A | 12/1991 | Ohashi et al. | |
| 5,078,222 A | 1/1992 | Hauser et al. | |
| 5,094,077 A | 3/1992 | Okada | |
| 5,094,326 A | 3/1992 | Schemelin et al. | |
| 5,136,845 A | 8/1992 | Woodley | |

(Continued)

OTHER PUBLICATIONS

Technical Information Manual for Series 40 Pumps, SPV40E, Rev. Apr., 1997.

(Continued)

*Primary Examiner*—Edward K. Look
*Assistant Examiner*—Igor Kershteyn
(74) *Attorney, Agent, or Firm*—Neal, Gerber & Eisenberg LLP

(57) ABSTRACT

A control mechanism for a hydraulic drive apparatus such as a transaxle having a hydraulic pump and moveable swash plate mounted in a housing including a control arm for moving the swash plate between forward and reverse positions and a unidirectional return to neutral mechanism for biasing and returning the swash plate to a neutral position when the control arm is in one of the reverse or forward positions but not from the other position.

25 Claims, 16 Drawing Sheets

U.S. PATENT DOCUMENTS

| | | |
|---|---|---|
| 5,146,748 A | 9/1992 | Okada |
| 5,163,293 A | 11/1992 | Azuma et al. |
| 5,182,966 A | 2/1993 | von Kaler et al. |
| 5,201,692 A | 4/1993 | Johnson et al. |
| 5,289,738 A | 3/1994 | Szulczewski |
| 5,311,740 A | 5/1994 | Shiba et al. |
| 5,314,387 A | 5/1994 | Hauser et al. |
| 5,333,451 A | 8/1994 | Sakikawa et al. |
| 5,339,631 A | 8/1994 | Ohashi |
| 5,373,697 A | 12/1994 | Jolliff et al. |
| 5,383,376 A | 1/1995 | Thorman et al. |
| 5,440,951 A | 8/1995 | Okada et al. |
| 5,546,752 A | 8/1996 | Horton et al. |
| 5,555,727 A | 9/1996 | Hauser et al. |
| 5,588,294 A | 12/1996 | Sakakura et al. |
| 5,622,051 A | 4/1997 | Iida et al. |
| 5,771,758 A | 6/1998 | Hauser |
| 5,794,443 A | 8/1998 | Shimizu |
| 5,819,537 A | 10/1998 | Okada et al. |
| 5,836,159 A | 11/1998 | Shimizu et al. |
| 5,842,532 A | 12/1998 | Fox et al. |
| 5,860,884 A | 1/1999 | Jolliff |
| 5,873,287 A | 2/1999 | Kawada |
| 5,887,484 A | 3/1999 | Abend et al. |
| 5,918,691 A * | 7/1999 | Ishii ............ 60/484 |
| 6,010,423 A | 1/2000 | Jolliff et al. |
| 6,122,996 A | 9/2000 | Hauser et al. |
| 6,125,630 A * | 10/2000 | Abend et al. ........ 60/487 |
| 6,152,247 A | 11/2000 | Sporrer et al. |
| 6,272,854 B1 | 8/2001 | Ishii et al. |
| 6,314,730 B1 | 11/2001 | Shimizu |

OTHER PUBLICATIONS

Eaton, Hydrostatic Transaxles, Catalog 11-888, Aug. 1991.

* cited by examiner

HYDRAULIC APPARATUS WITH RETURN TO NEUTRAL MECHANISM

RELATED APPLICATION

This application is a continuation of U.S. application Ser. No. 10/305,213 filed on Nov. 26, 2002, which is a continuation-in-part of and claims the benefit of U.S. application Ser. No. 09/789,419 filed on Feb. 20, 2001, now U.S. Pat. No. 6,487,857. Both of these applications are incorporated herein by reference in their entirety.

BACKGROUND OF THE INVENTION

This invention relates generally to axle driving apparatus and, more particularly, to a return to neutral mechanism adapted to be mounted to the casing of a transaxle such as zero-turn transaxle. The return to neutral mechanism disclosed herein could also be used with hydraulic pumps or other types of hydrostatic transaxles.

Transaxle and hydrostatic transmission assemblies ("HSTs") are known in the art. Generally, an HST includes a center section on which is mounted to a rotating hydraulic pump and a rotating hydraulic motor. The hydraulic pump and the hydraulic motor each carry a plurality of reciprocating pistons which are in fluid communication through hydraulic porting formed in the center section. Rotation of the hydraulic pump against a moveable swash plate creates an axial motion of the pump pistons that forces an operating oil through the hydraulic porting to the hydraulic motor to move the motor pistons. The axial motion of the motor pistons causes the hydraulic motor to rotate as the motor pistons bear against a thrust bearing. In this manner, the rotation of the hydraulic motor may be used to drive the vehicle axles of a riding lawn mower, small tractor and the like.

To adjust the speed and direction of rotation of the hydraulic motor and, accordingly, the speed and direction of rotation of the vehicle axles, the position of the swash plate with respect to the hydraulic pump pistons may be changed. The orientation with which the swash plate addresses the hydraulic pump pistons can be changed to control whether the hydraulic motor rotates in the forward direction or in the reverse direction. Additionally, the angle at which the swash plate addresses the hydraulic pump pistons can be changed to increase or decrease the amount of operating oil that is forced from the hydraulic pump to the hydraulic motor to change the speed at which the hydraulic motor rotates.

For use in changing the position of the moveable swash plate, it is known to include a trunnion arm that is coupled to the swash plate. A speed change lever or a speed change pedal is, in turn, coupled to the trunnion arm through a wire or other driving link. In this manner, movement of the speed change lever/pedal results in movement of the trunnion arm to change the position of the swash plate to thereby control the speed and direction of the vehicle. Examples of such mechanisms for adjusting the speed of a vehicle may be seen in U.S. Pat. Nos. 6,122,996 and 5,819,537 which are incorporated herein by reference in their entirety.

For placing the swash plate in a position that neither effects the speed nor the direction of rotation of the hydraulic motor, i.e., the neutral position, known hydraulic pumps and hydrostatic transaxles provide a return to neutral mechanism that is normally implemented as an integral part of the vehicle linkage. While these return to neutral mechanisms work for their intended purpose, they do suffer disadvantages. For example, these known return to neutral mechanisms fail to allow for flexibility whereby different types and orientations of driving linkages may be used in connection with the hydraulic pumps and hydraulic transaxles.

SUMMARY OF THE INVENTION

To overcome these disadvantages, the present invention is realized in an improved speed adjusting mechanism having an integral return to neutral mechanism that is adapted to be mounted to the casing of a hydraulic pump or hydrostatic transaxle. For simplicity of explanation the invention will be described in association with an integrated zero turn transaxle (IZT). The IZT includes a hydraulic transmission mounted within the casing that includes a rotatable hydraulic pump in fluid communication with a rotatable hydraulic motor and a moveable swash plate cooperable with the rotatable hydraulic pump for controlling the speed and direction of rotation of the hydraulic motor. The rotation of the hydraulic motor is used to drive a single axle shaft.

For controlling the positioning of the swash plate, the transaxle further includes a rotatable trunnion arm coupled to the moveable swash plate. The rotatable trunnion arm extends from the casing and is coupled to the speed adjusting mechanism. The speed adjusting mechanism is mounted to the casing and is used to rotate the trunnion arm to change the orientation of the swash plate to change the speed and direction of rotation of the hydraulic motor.

More specifically, the speed adjusting mechanism includes a return arm adapted to be mounted to the casing in a fixed position indicative of a neutral position of the trunnion arm. The neutral position of the trunnion arm is the position of the trunnion arm in which the swash plate does not influence the speed and direction of rotation of the hydraulic motor. Additionally, the speed adjusting mechanism includes a control arm that is mounted to and moves the trunnion arm. A pair of scissor return arms are provided that are adapted to move the control arm in cooperation with the return arm for the purpose of moving the trunnion arm to the neutral position. To provide additional mounting flexibility, the control arm is adapted to be mounted to the trunnion arm in any one of a plurality of different positions and the return arm is capable of being mounted to the casing in a corresponding position such that the return arm can be aligned with the control arm to establish the neutral position.

In a further embodiment of this invention, the return to neutral feature is unidirectional, in that it provides a return force when the unit is stroked in one direction, either reverse or forward, but does not provide any return force when the unit is stroked in the opposite direction. In certain applications, the user may want to have such a return force only when the unit is in reverse, for operational purposes, but not want to have it in the forward direction, since the maintenance of the force needed to overcome the return force may be tiring to the user, or may be otherwise unnecessary.

A better understanding of the objects, advantages, features, properties and relationships of the invention will be obtained from the following detailed description and accompanying drawings which set forth an illustrative embodiment and which are indicative of the various ways in which the principles of the invention may be employed.

DETAILED DESCRIPTION OF THE DRAWINGS

Figure 1:
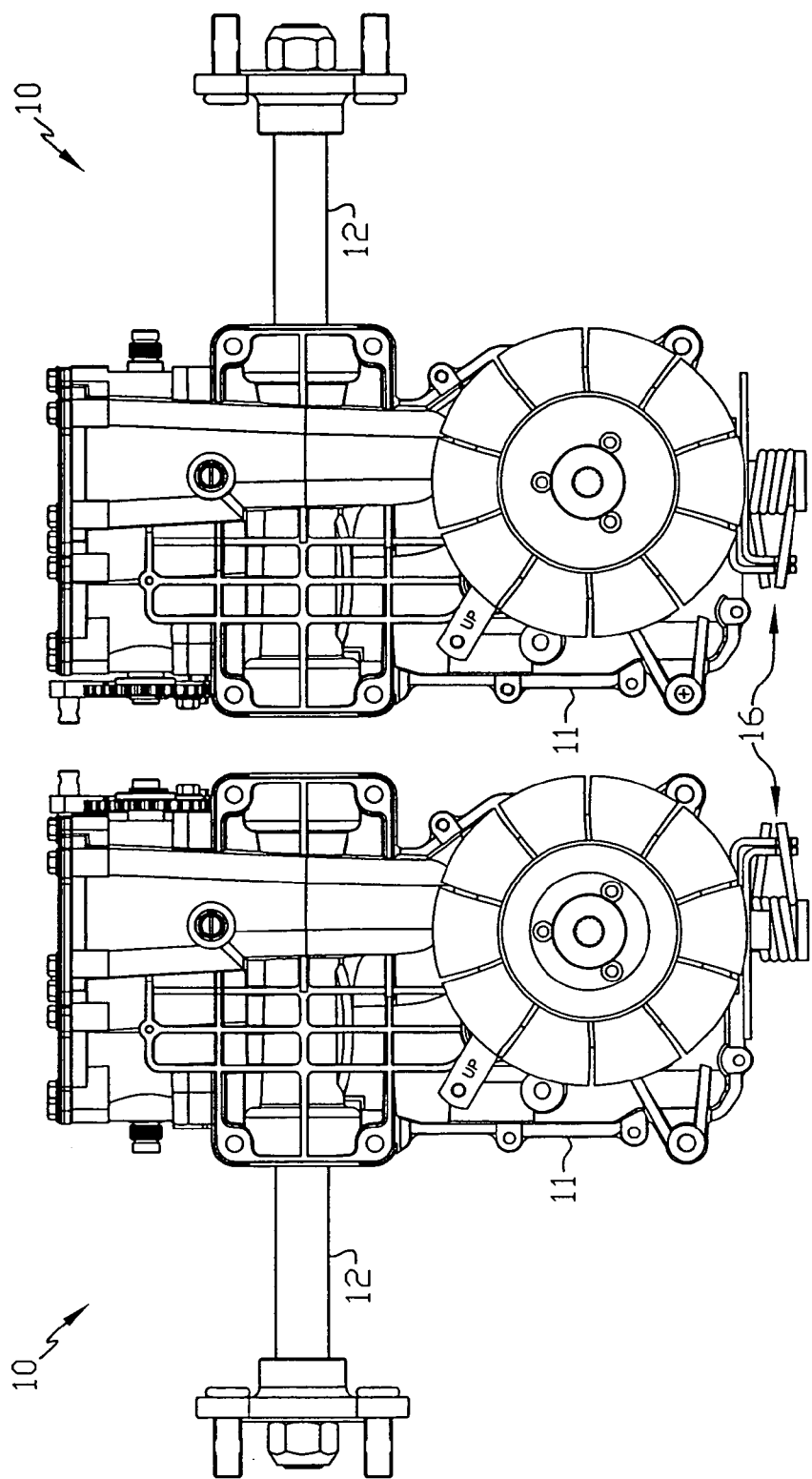
FIG. 1 is a top plan view of a pair of integrated, zero-turn transaxles ("IZTs") each having a speed adjusting mechanism constructed in accordance with the principles of the subject invention.
Figure 2:
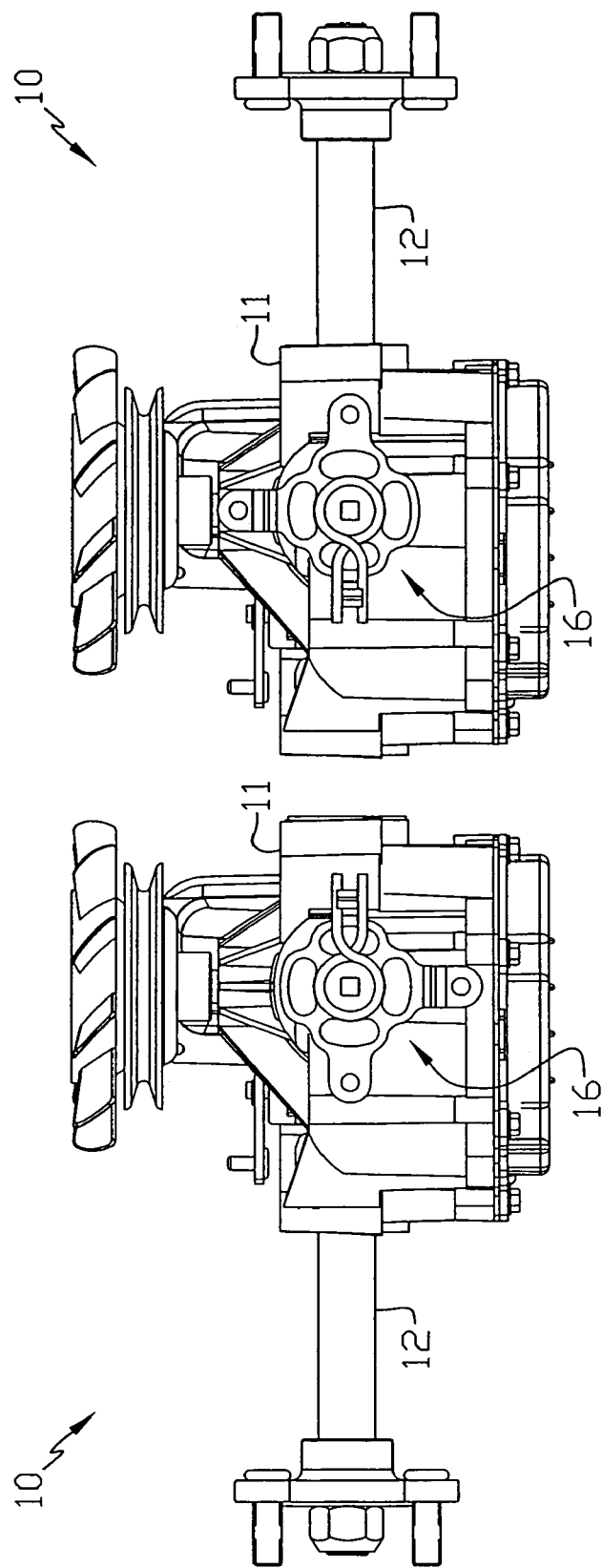
FIG. 2 is a front plan view of the IZTs of FIG. 1.
Figure 3:
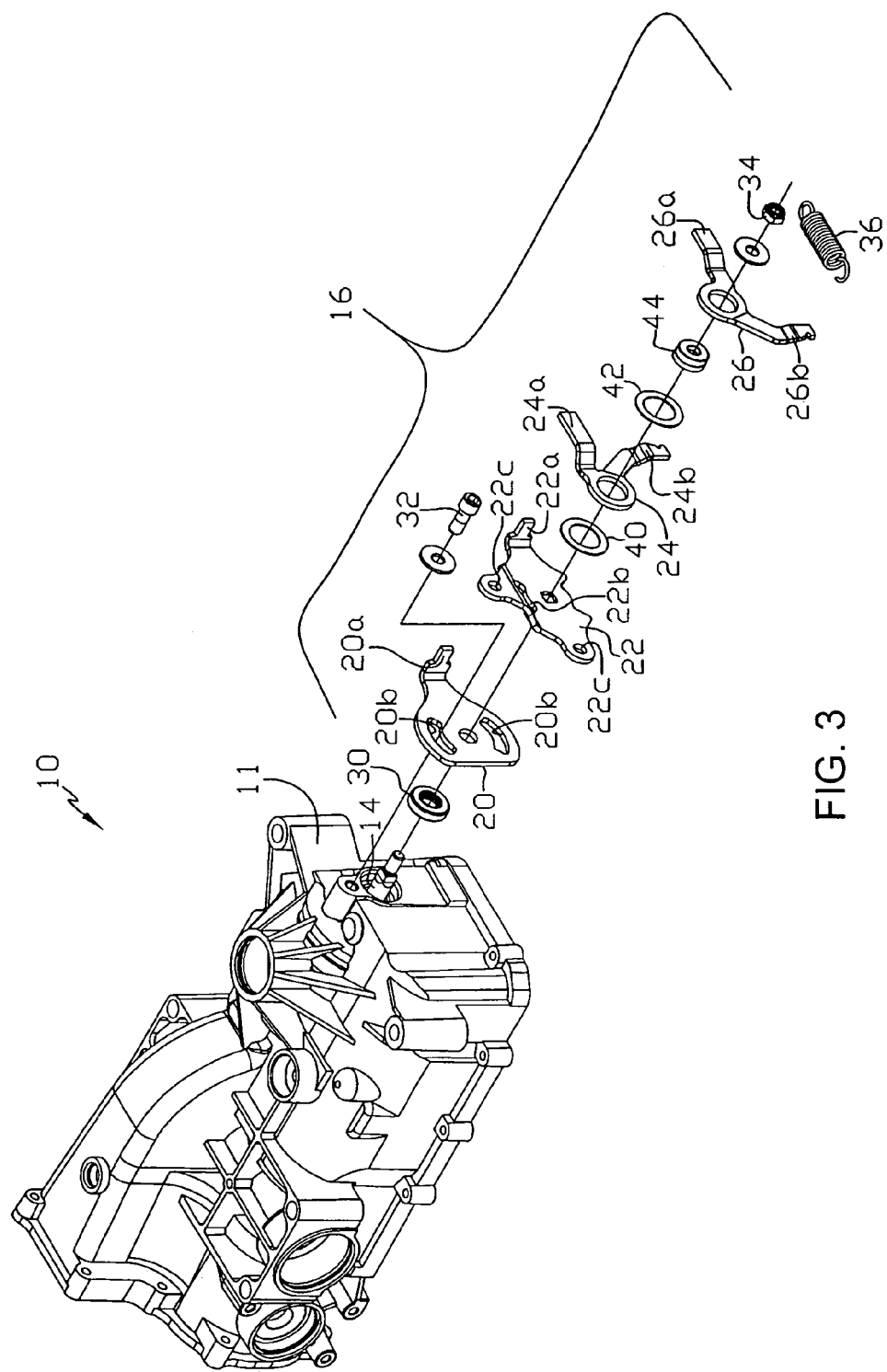
FIG. 3 is an exploded view of a further speed adjusting mechanism for use in connection with the IZTs of FIGS. 1 and 2.
Figure 4:
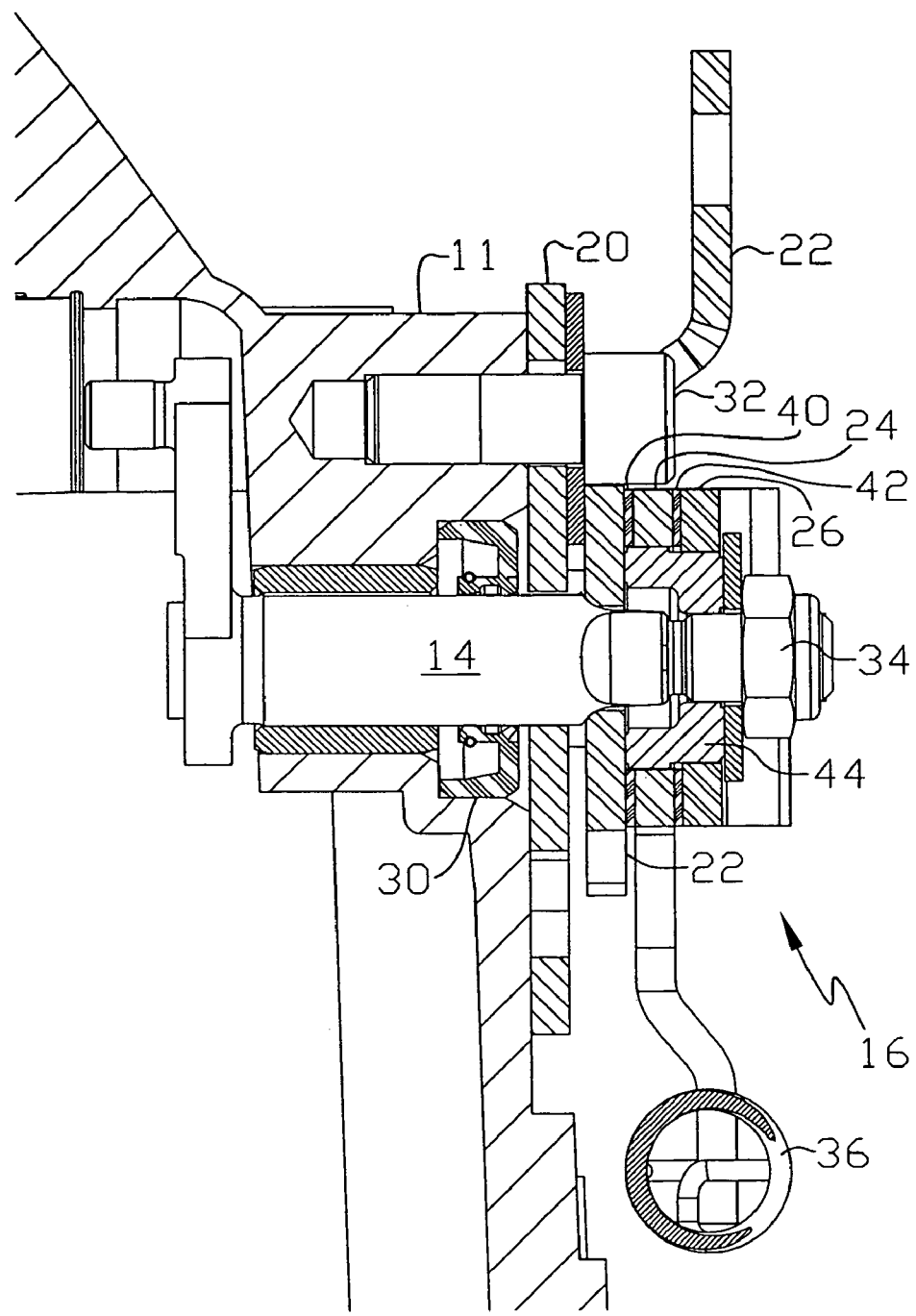
FIG. 4 is a cross-sectional view of the speed adjusting mechanism of FIG. 3.
Figure 5:
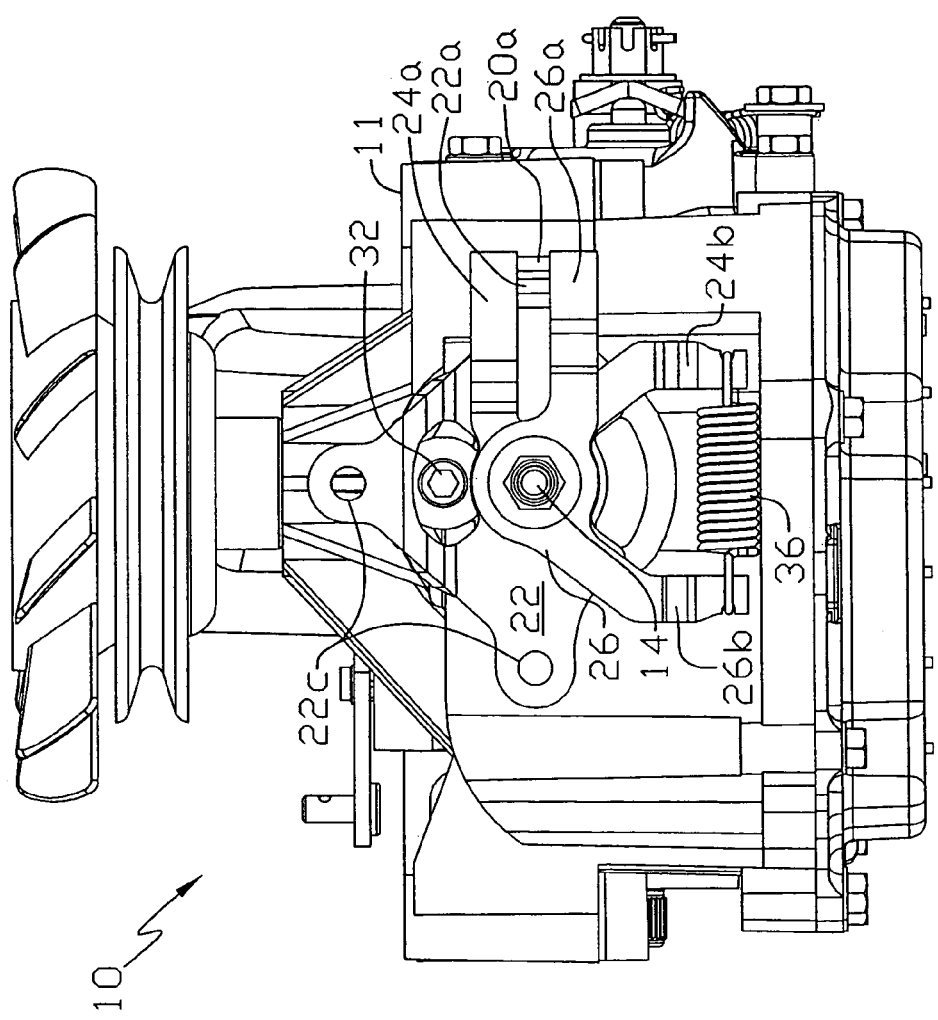
FIG. 5 is a front plan view of the embodiment shown in FIG. 3, with the speed adjusting mechanism in the neutral position.

Turning now to the figures, wherein like reference numeral refer to like elements, there is illustrated an integrated, zero-turn transaxle 10 ("IZT"). As described in greater detail in U.S. Pat. No. 6,152,247, which is incorporated herein by reference in its entirety, the illustrated IZT 10 operates on the principle of an input shaft driving a hydraulic pump which, through the action of its pistons, pushes oil to a hydraulic motor through a center section to cause the rotation of a motor shaft. The rotation of the motor shaft is eventually transferred through a gearing system or the like to drive a single axle shaft 12. As particularly illustrated in FIGS. 1 and 2, the axle shaft 12 may be positioned for either left-handed or right-handed drive.

For adjusting the amount of oil that is pushed from the hydraulic pump to the hydraulic motor, the IZT 10 includes a moveable swash plate against which the pump pistons travel. As will be understood by those of ordinary skill in the art, the swash plate may be moved to a variety of positions to vary the stroke of the pump pistons and the direction of rotation of the hydraulic motor. As the stroke of the pump pistons is varied, the volume of the hydraulic fluid pumped into the hydraulic porting of the center section will vary. Since the speed of rotation of the hydraulic motor is dependent upon the amount of hydraulic fluid pumped thereinto by the hydraulic pump and the direction of rotation of the hydraulic motor is dependent upon the direction of rotation of the hydraulic pump, the positioning of the swash plate is seen to control the speed and direction of rotation of the hydraulic motor and, accordingly, the speed and direction of rotation of the axle shaft 12.

For moving the swash plate, the swash plate assembly is connected to a moveable trunnion arm 14 that is rotatably supported in the casing 11 of the IZT 10. As will be appreciated, rotation of the trunnion arm 14 changes the angular orientation of the swash plate assembly with respect to the pump pistons. To rotate the trunnion arm 14 and, accordingly, move the swash plate assembly, a speed adjusting mechanism 16 is coupled to the trunnion arm 14. The speed adjusting mechanism 16 may be connected, via a driving link, to a lever or a pedal provided on a vehicle whereby movement of the lever or pedal is translated to the speed adjusting mechanism 16 to cause the rotation of the trunnion arm 14 and movement of the swash plate assembly. Since the trunnion arm 14 extends from the IZT casing 11 to engage the speed adjusting mechanism 16, a seal 30 can be placed around the trunnion arm 14 to prevent leakage of hydraulic fluid from the opening in the IZT casing 11 from which the trunnion arm 14 extends.

For use in rotating the trunnion arm 14, the speed adjusting mechanism 16, illustrated more clearly in FIGS. 3–7, is comprised of a return arm 20, a control arm 22, an inner scissor return arm 24, and an outer scissor return arm 26. A nut 34, which would be mated with corresponding threads on the end of the trunnion arm 14, retains the return arm 20, control arm 22, inner scissor return arm 24, and outer scissor return arm 26 on the trunnion arm 14. As will be described in greater detail below, the speed adjusting mechanism also functions to substantially establish the neutral position of the trunnion arm 14, i.e., the position of the trunnion arm 14 where the swash plate assembly does not influence the flow of hydraulic fluid within the hydraulic circuit formed between the hydraulic pump and the hydraulic motor, and to bias and move the trunnion arm 14 towards this neutral position.

To provide for rotation of the trunnion arm 14, the control arm 22 is non-rotatably mounted to the end of the trunnion arm 14. The non-rotatable mating of the control arm 22 to the trunnion arm 14 is preferably accomplished by providing the control arm 22 and trunnion arm 14 with complimentary mating shapes. By way of example, the trunnion arm 14 can be provided with a square shaped end that is adapted to mate with a corresponding square shaped opening in the control arm 22. In this manner, rotation of the control arm 22 will also result in rotation of the trunnion arm 14. For moving the control arm 22 and, accordingly, the trunnion arm 14 and the swash plate assembly to thereby control the speed and direction of rotation of the axle shaft 12, the control arm 22 includes openings 22c to which hand/foot/electronically operated driving links may be attached.

During assembly, the control arm 22 is mounted to the trunnion arm 14 with the return arm 20 positioned between the control arm 22 and the IZT casing 11. The inner scissor return arm 24 and the outer scissor return arm 26 are mounted adjacent to the control arm 22 before the nut 34 is mated with the end of the trunnion arm 14. A biasing means 36, such as a spring, is linked to the inner and outer scissor return arms 24/26, in particular, to arms 24b/26b of the inner and outer scissor return arms 24/26 respectively. It will be appreciated that various types of biasing means are available, as exemplified by the two different types of springs illustrated in FIGS. 1 and 2 and in FIGS. 3–8. Once the components are mounted to the trunnion arm 14, the control arm 22 is moved until the trunnion arm 14 places the swash plate in the neutral position.

When the trunnion arm 14 is placed in the position that corresponds to the neutral position of the swash plate, the return arm 20 is attached to the IZT casing 11. For this purpose, an attachment device 32, such as a bolt/washer combination or the like, is inserted through an opening 20b and mated with the IZT casing 11 to trap the return arm 20 between the attachment device 32 and the IZT casing 11. The attachment device 32 cooperates with the IZT casing 11 to frictionally prevent the return arm 20 from moving. At this time, under the influence of the biasing means 36, projection 22a of the control arm 22 and projection 20a of the return arm 20 will be in alignment. This alignment of the projections 22a and 20a establishes the neutral position. In the neutral position, both the inner scissor return arm 24 and the outer scissor return arm 26 are in contact with the projection 22a of the control arm 22 as particularly illustrated in FIG. 5. Specifically, arm 24a of the inner scissor return arm 24 and arm 26a of the outer scissor return arm 26 will be brought into contact with the projection 22a of the control arm 22 under the influence of the biasing means 36.

Figure 6:
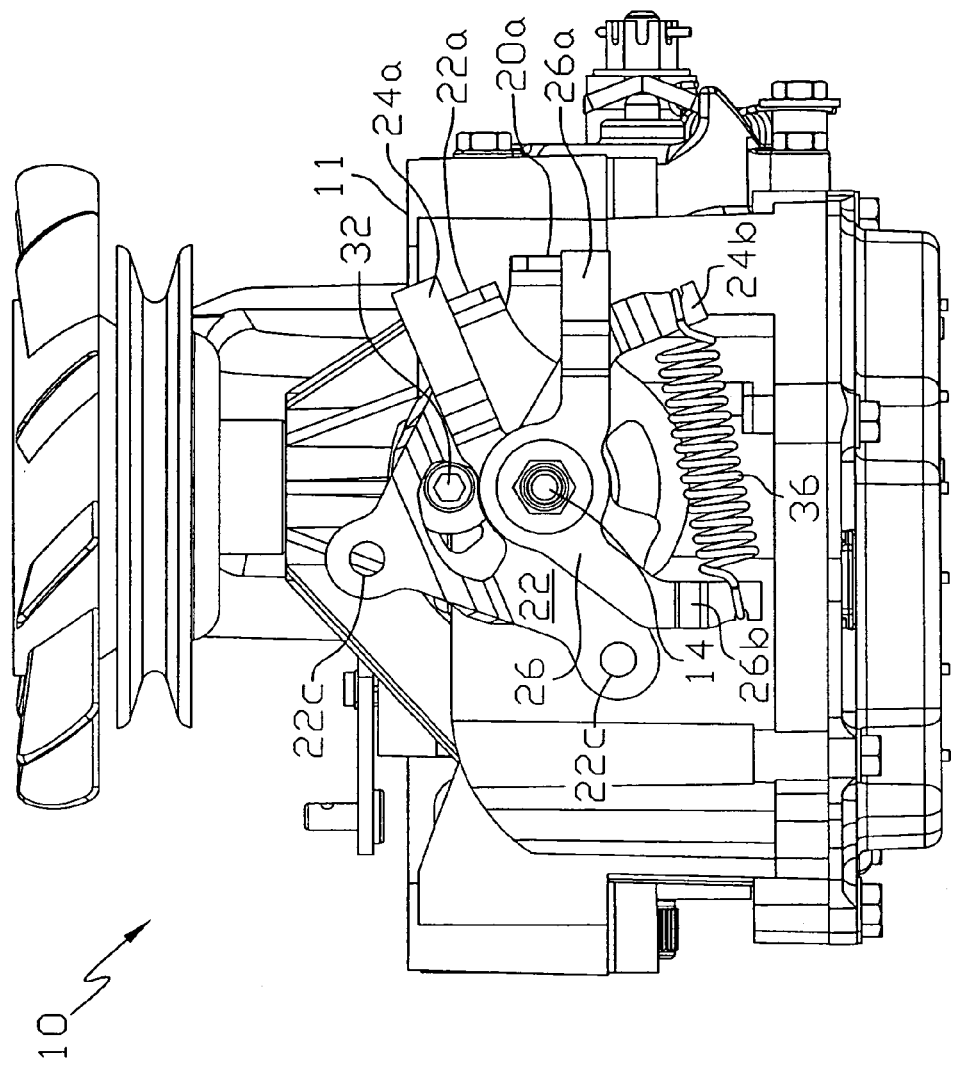
FIG. 6 is a front plan view of the embodiment shown in FIG. 3, with the speed adjusting mechanism in the forward throttle position.

When the speed adjusting mechanism 16 is rotated under the influence of a driving link to drive the axle shaft 12 in the reverse direction, the projection 22a of the control arm 22 will contact the arm 24a of the inner scissor return arm 24. As a result of this contact, movement of the control arm 22 will also result in the movement of the inner scissor return arm 24. Meanwhile, the arm 26a of the outer scissor return arm 26 is prevented from moving as it remains in contact with the projection 20a of the return arm 20 as is illustrated in FIG. 6.

Once the influence of the driving link is removed from the control arm 22, the biasing means 36 will cause the inner scissor return arm 24 to move toward the outer scissor return arm 26 that is prevented from moving through its contact with the projection 20a of the return arm 20. During this movement of the inner scissor return arm 24, the inner scissor return arm 24 will contact the control arm 22 to also move the control arm 22 towards the stationary outer scissor return arm 26 and the projection 20a of the return arm 20. The movement of the inner scissor return arm 24 and the control arm 22 caused by the biasing means 36 will continue until the projection 22a of the control arm 22 aligns with the projection 20a of the return arm 20 and both the inner and outer scissor return arms 24/26 contact the projection 22a of the control arm 22. Thus, under the influence of the biasing means 36 the trunnion arm 14 is returned to the neutral position illustrated in FIG. 5.

Figure 7:
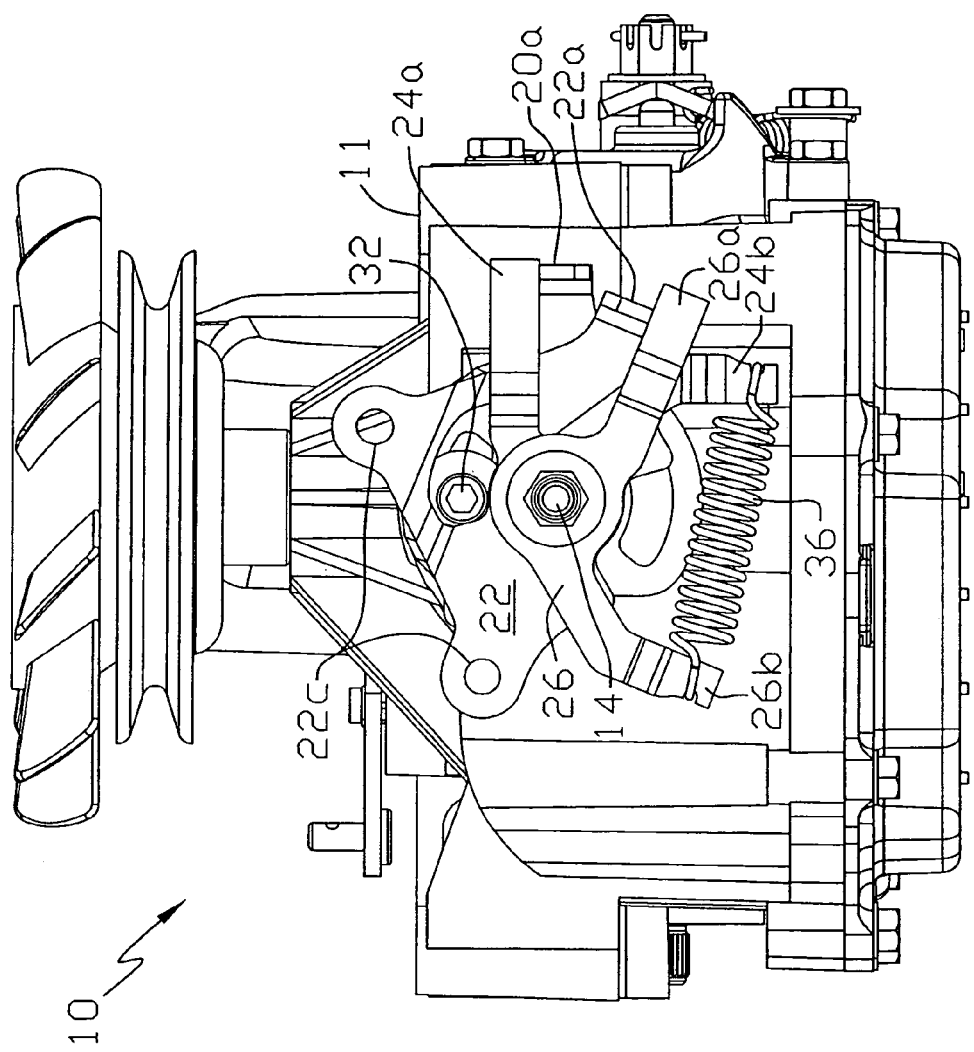
FIG. 7 is a front plan view of the embodiment shown in FIG. 3, with the speed adjusting mechanism in the reverse throttle position.
Figure 8A:
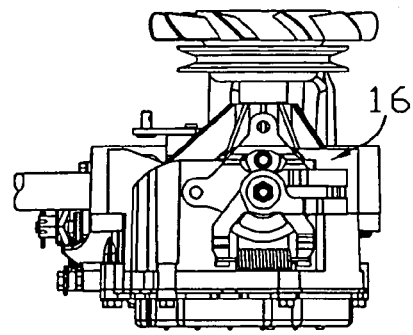
FIGS. 8a–8h are exemplary orientations of a speed adjusting mechanism the IZTs of FIGS. 1 and 2.
Figure 8B:
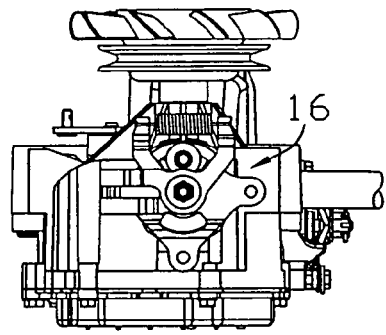
Figure 8C:
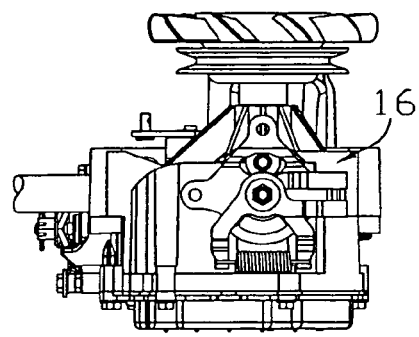
Figure 8D:
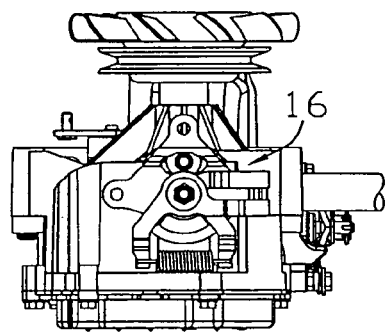
Figure 8E:
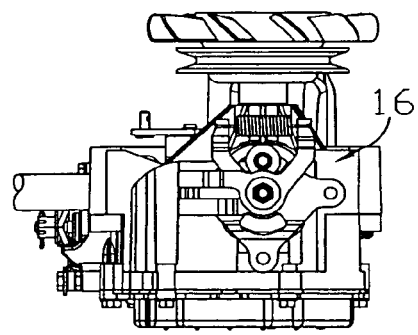
Figure 8F:
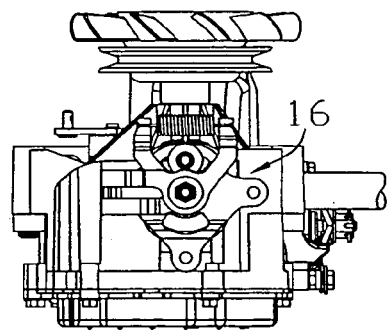
Figure 8G:
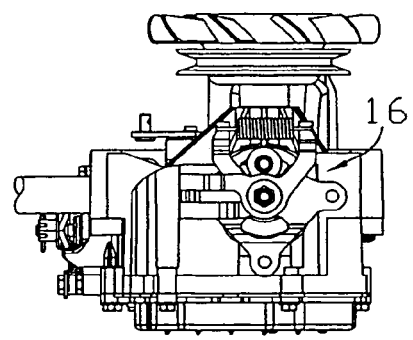
Figure 8H:
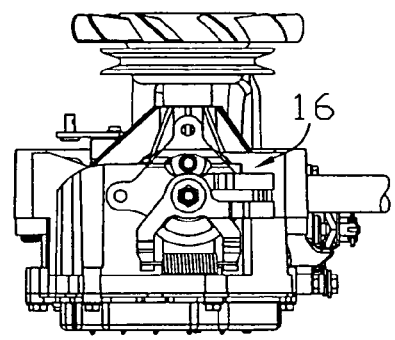
Figure 9:
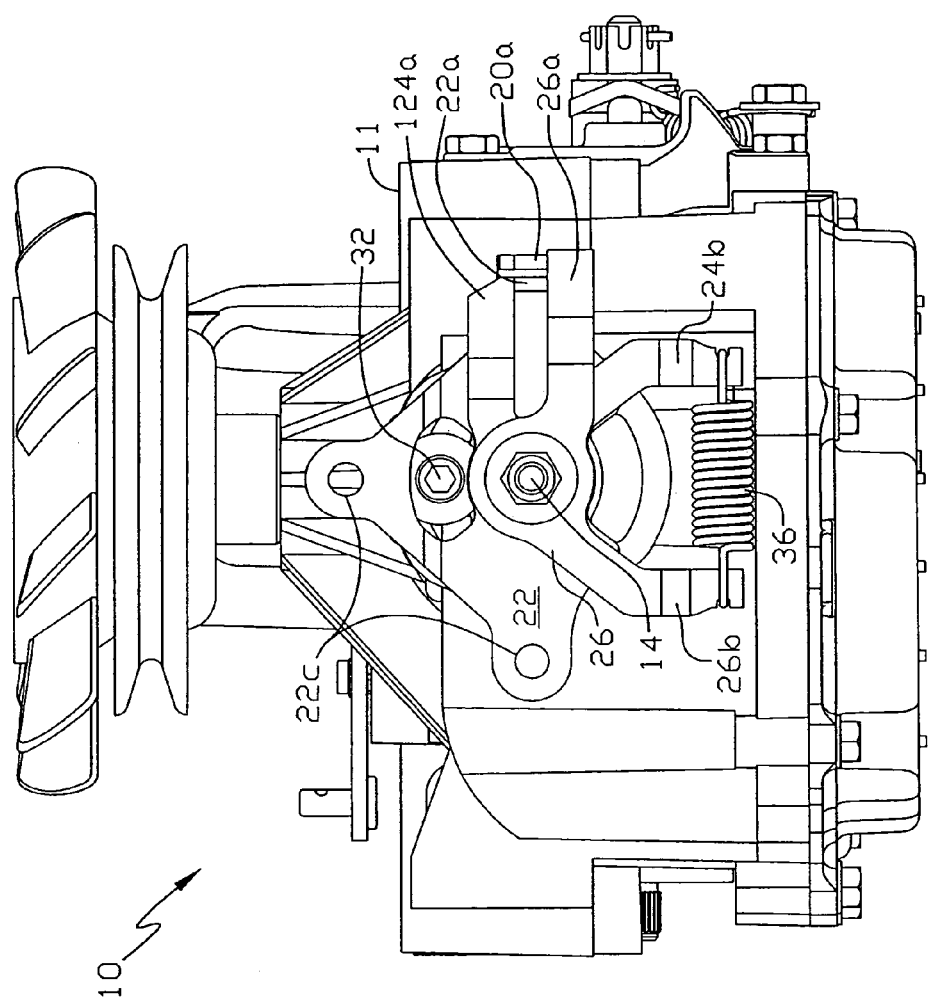
FIG. 9 is a front elevational view of an alternative incorporating a unidirectional return to neutral mechanism.
Figure 10:
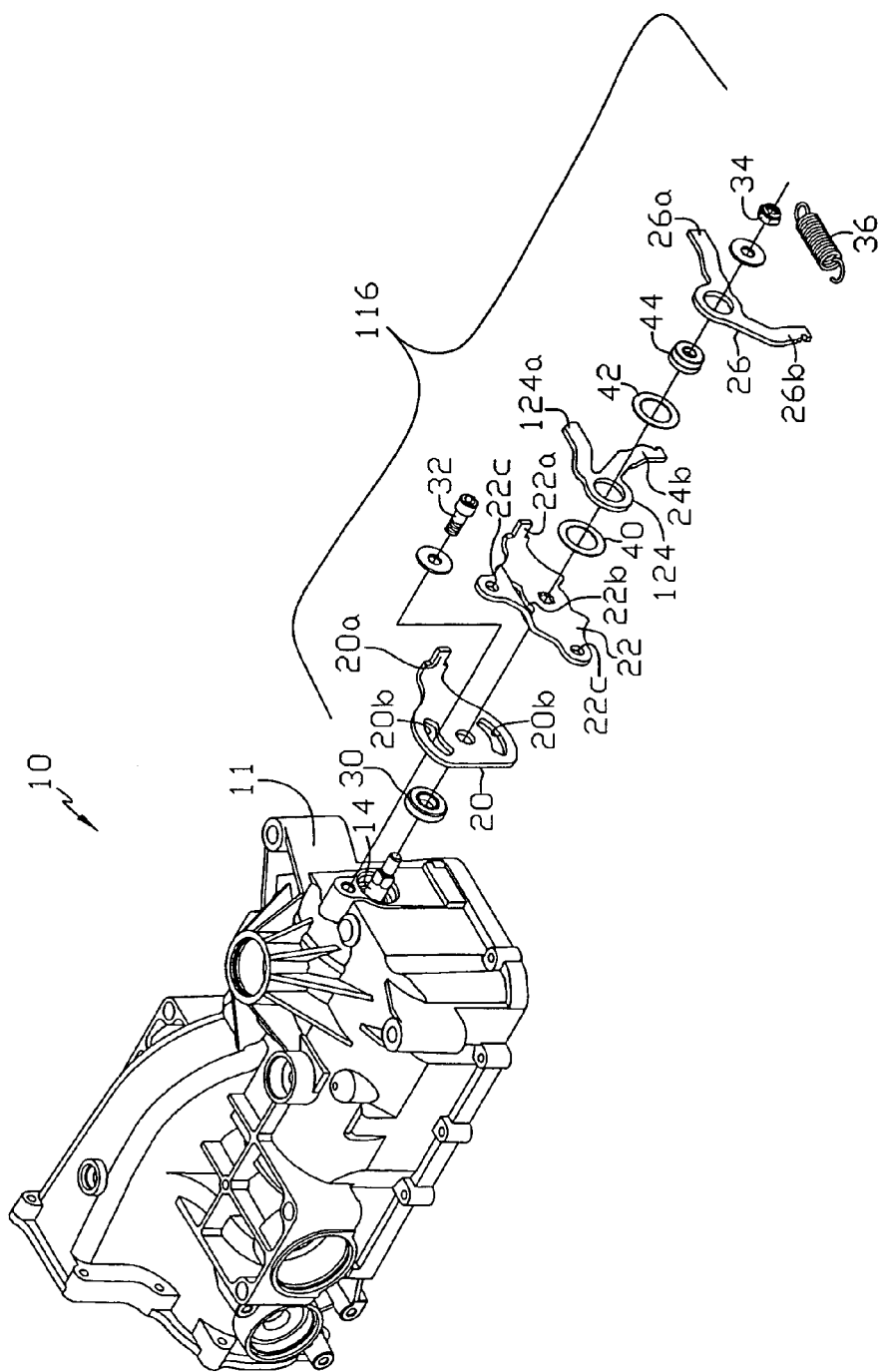
FIG. 10 is an exploded view of the embodiment shown in FIG. 9.
Figure 11:
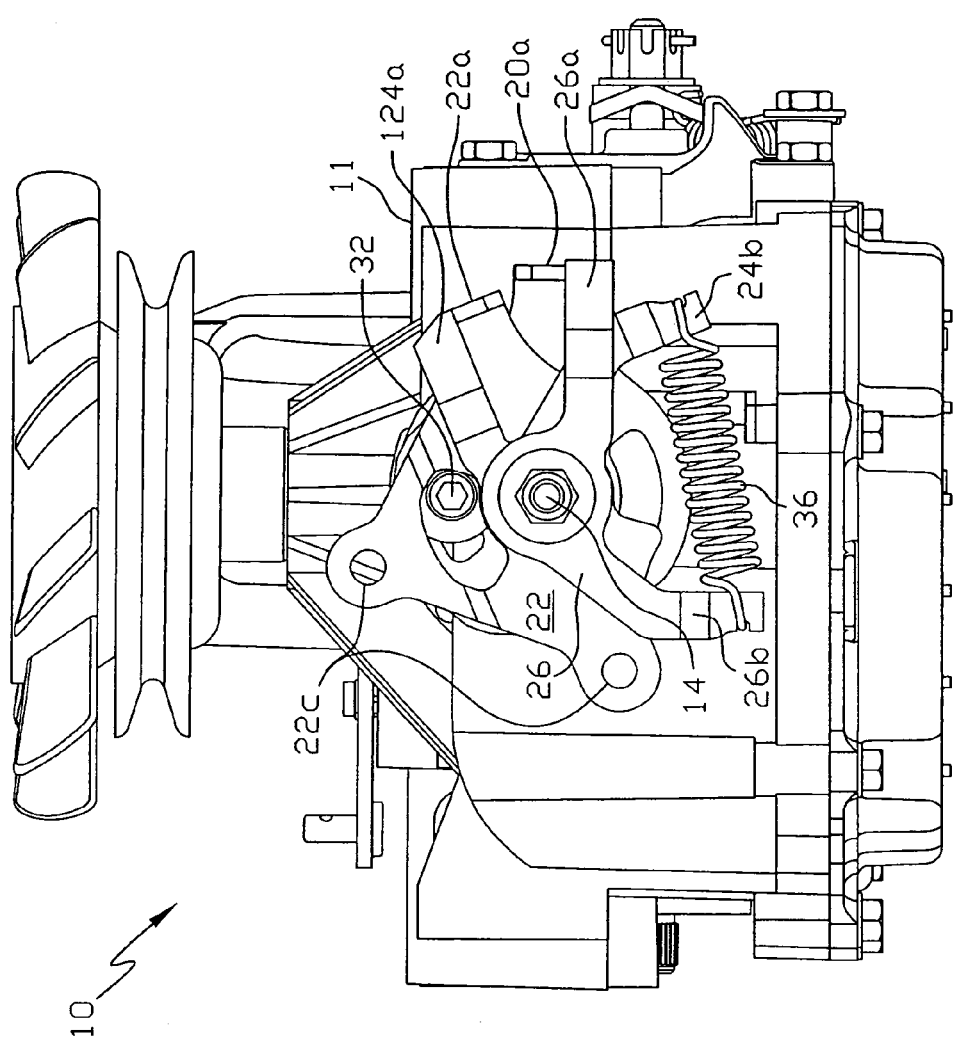
FIG. 11 is a front elevational view of the embodiment shown in FIG. 9, with the speed adjusting mechanism in the reverse direction.
Figure 12:
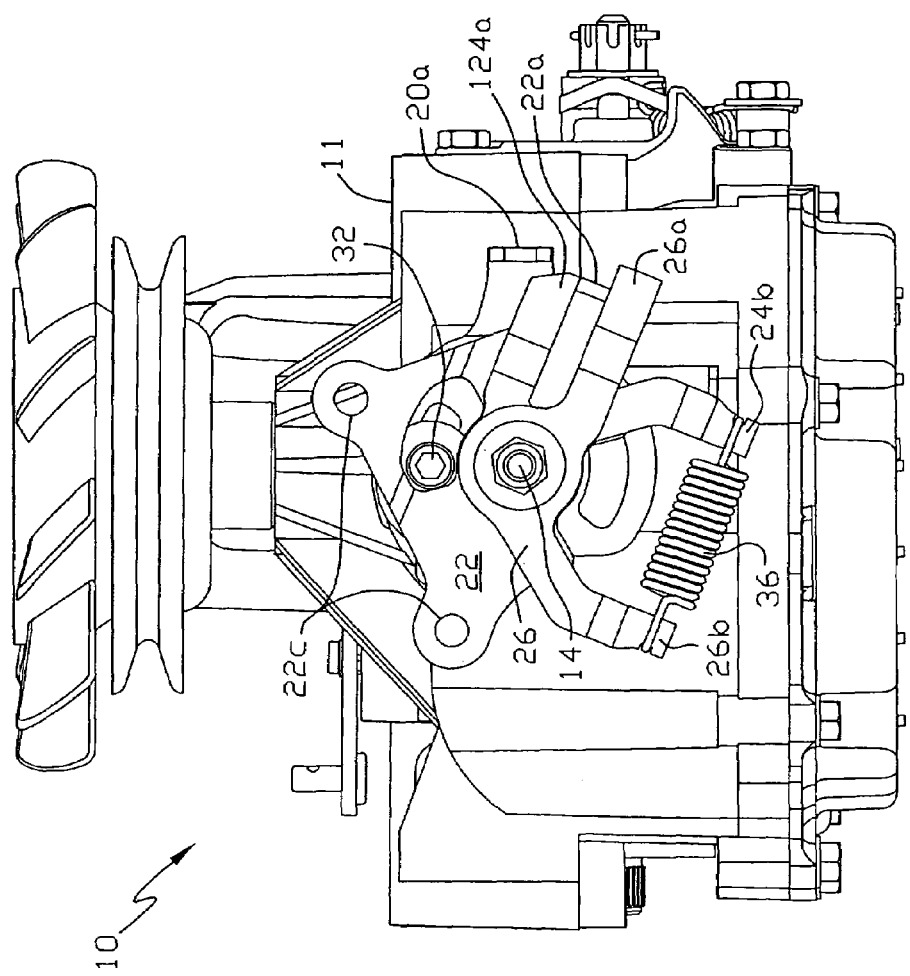
FIG. 12 is a front elevational view of embodiment shown in FIG. 9, with the speed adjusting mechanism in the forward direction.
Figure 13:
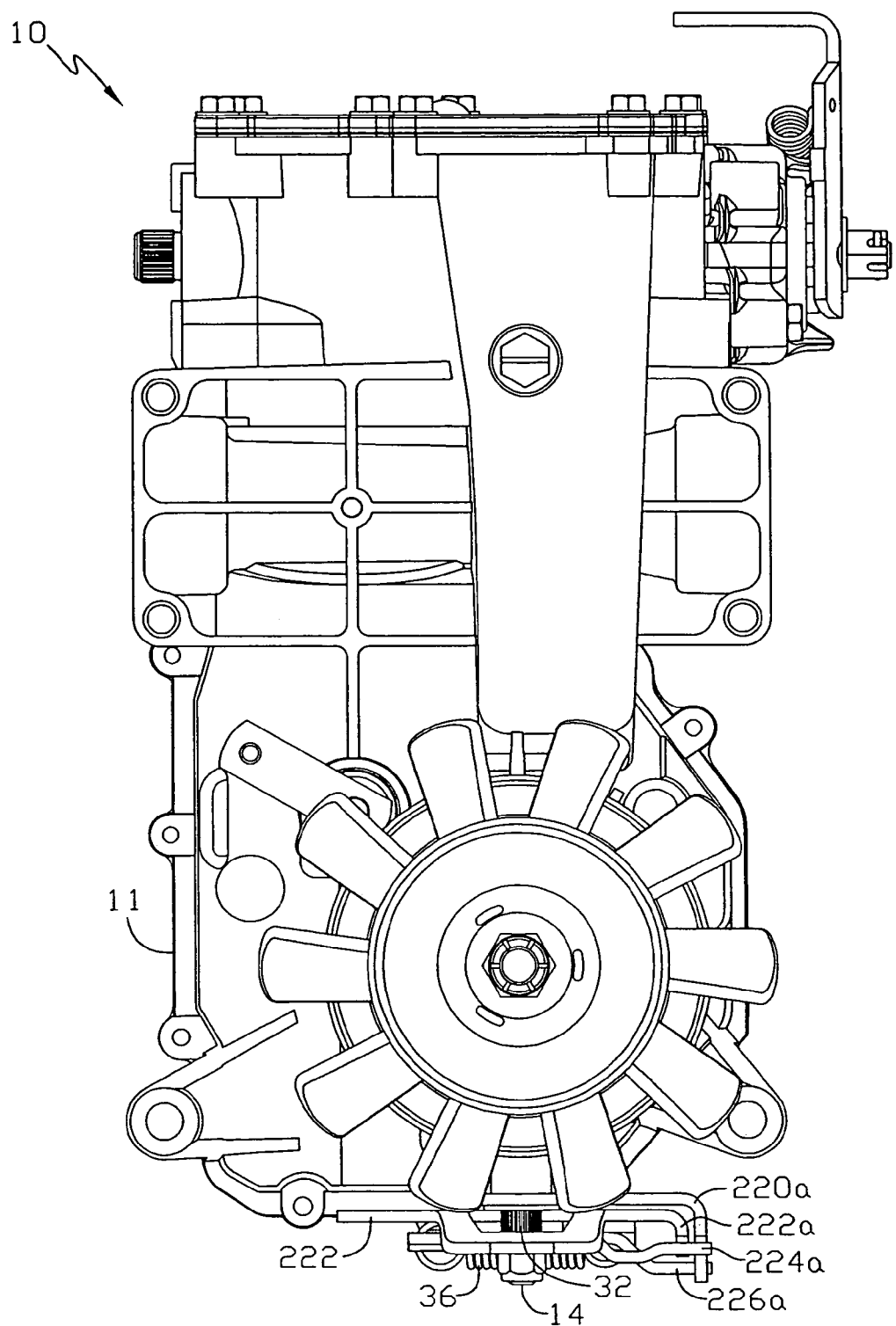
FIG. 13 is a front elevational view of a further alternative embodiment of a unidirectional return to neutral mechanism of this invention.
Figure 14:
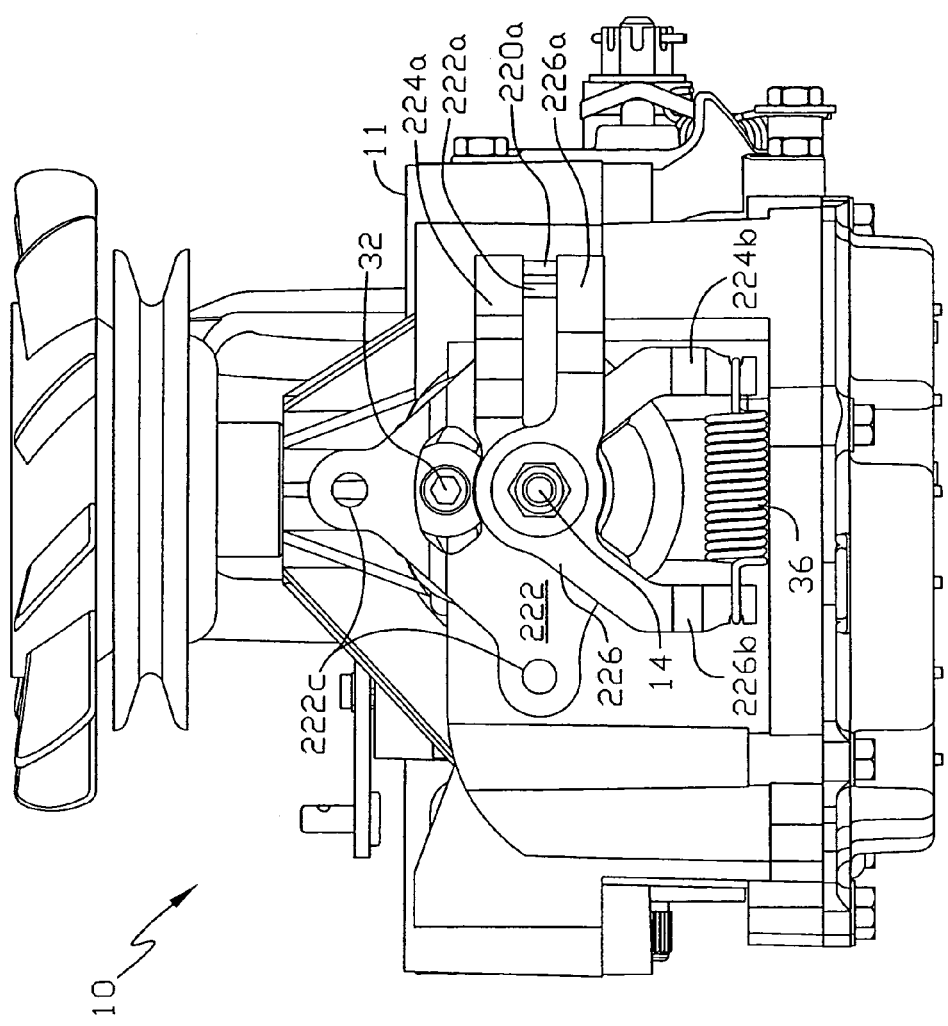
FIG. 14 is a top plan view of the embodiment shown in FIG. 13.

When the speed adjusting mechanism 16 is rotated under the influence of a driving link to drive the axle shaft 12 in the forward direction, the projection 22a of the control arm 22 will contact the arm 26a of the outer scissor return arm 26. As a result of this contact, movement of the control arm 22 will also result in the movement of the outer scissor return arm 26. Meanwhile, the arm 24a of the inner scissor return arm 24 is prevented from moving as it remains in contact with the projection 20a of the return arm 20 as is illustrated in FIG. 7.

Once the influence of the driving link is removed from the control arm 22, the biasing means 36 will cause the outer scissor return arm 26 to move towards the inner scissor return arm 24 that is in contact with the projection 20a of the return arm 20. During this movement of the outer scissor return arm 26, the outer scissor return arm 26 will contact the control arm 22 to also move the control arm 22 towards the inner scissor return arm 24 and the projection 20a of the return arm 20. The movement of the outer scissor return arm 26 and the control arm 22 caused by the biasing means 36 will continue until the projection 22a of the control arm 22 aligns with the projection 20a of the return arm 20 and both the inner and outer scissor return arms 24/26 contact the projection 22a of the control arm 22. Thus, under the influence of the biasing means 36 the trunnion arm 14 is returned to the neutral position illustrated in FIG. 5.

To prevent wear of the components that comprise the speed adjusting mechanism 16, the inner and outer scissor return arms 24/26 can be constructed with a hardened wear surface. By way of example, the inner and outer scissor return arms 24/26 can be provided with a Zinc DiChromate, "Nitrotec" or other corrosion and wear resistant finish. For this same purpose optional wear resistant washers 40/42 can be positioned between the control arm 22 and inner scissor return arm 24 and the inner scissor return arm 24 and the outer scissor return arm 26, respectively. Such washers can be constructed of a nylon material. Additionally, a spacer 44 can be mounted over the end of the trunnion arm 14 about which the scissor return arms 24/26 may rotate.

For allowing the speed control mechanism 16 to be placed in a plurality of different orientations, as illustrated in FIGS. 8a–8h, the return arm 20 is provided with a plurality of openings 20b through which the attachment device 32 may pass. Preferably the openings are spaced at approximately 180 degree or 90 degree intervals. In this manner, the speed control mechanism 16 has the advantage of allowing the neutral marking position to be placed at a plurality of different positions with respect to the IZT 10 casing. This is particularly useful in the case of the subject IZT which can be configured for both left-handed and right-handed drive in that it allows a single control mechanism to be manufactured and used without regard to the ultimate configuration of the IZT and without regard to the positioning of the links used to drive the control arm 22.

For this same purpose, the control arm 22 can also be configured to allow it to be mounted on the trunnion arm 24 in a plurality of different positions. Specifically, if the control arm 22 is adapted to cooperate with the attachment device 32 to limit the degree of movement of the control arm 22, multiple cooperating elements can be provided to the control, arm 22. By way of example, the control arm 22 can be provided with an opening 22b in which is disposed the attachment device 32. In this manner, when the edges of the opening 22b contact the attachment device 32, the control arm 22 is prevented from being moved further by the driving links. Accordingly, to allow the control arm 22 to be mounted on the trunnion arm 24 in a plurality of different positions, the control arm 22 can be provided with a plurality of spaced openings 22b. The openings 22b are preferably spaced at 180 degree or 90 degree intervals. Again, this is seen to particularly useful in the case of the subject IZT which can be configured for both left-handed and right-handed drive in that it allows a single control mechanism to be manufactured and used without regard to the ultimate configuration of the IZT and without regard to the positioning of the links used to drive the control arm 22.

An alternative embodiment of this invention is depicted in FIGS. 9–12 as speed adjusting mechanism 116, where like numerals indicate identical structure to that described above. This embodiment enables the user to provide the return to neutral feature in one direction only, referred to as a unidirectional return to neutral. Specifically, arm 124a of inner scissor return arm 124 is shortened so that it does not contact projection 20a of return arm 20. The effect of this arrangement can be seen most clearly in FIGS. 11 and 12; in FIG. 11, where the control arm 22 is stroked in the reverse direction, arm 26a contacts projection 20a as described above. However, in FIG. 12, where control arm 22 is stroked in the forward direction, inner scissor arm 124a does not contact projection 20a and both inner scissor return arm 124 and outer scissor return arm 26 rotate together, so that there is no return force supplied by biasing means 36.

Figure 15:
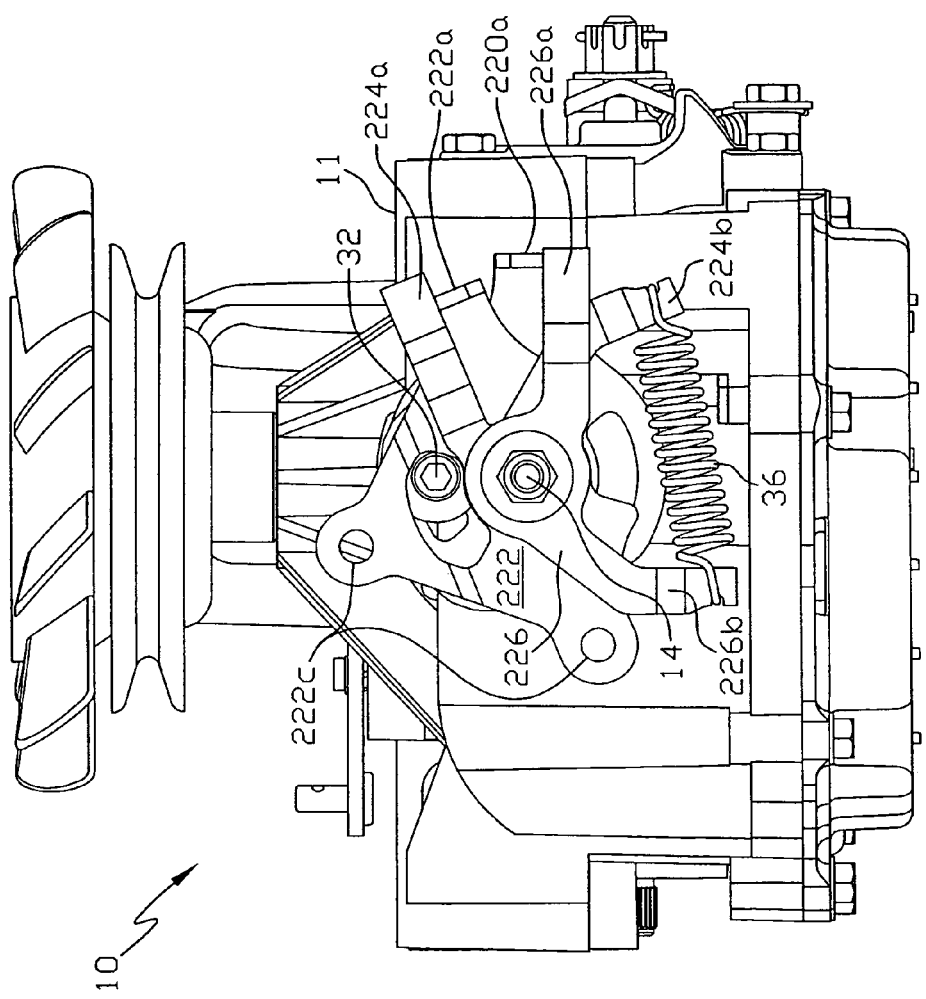
FIG. 15 is a front elevational view of the embodiment shown in FIG. 13, with the speed adjusting mechanism in the reverse direction.
Figure 16:
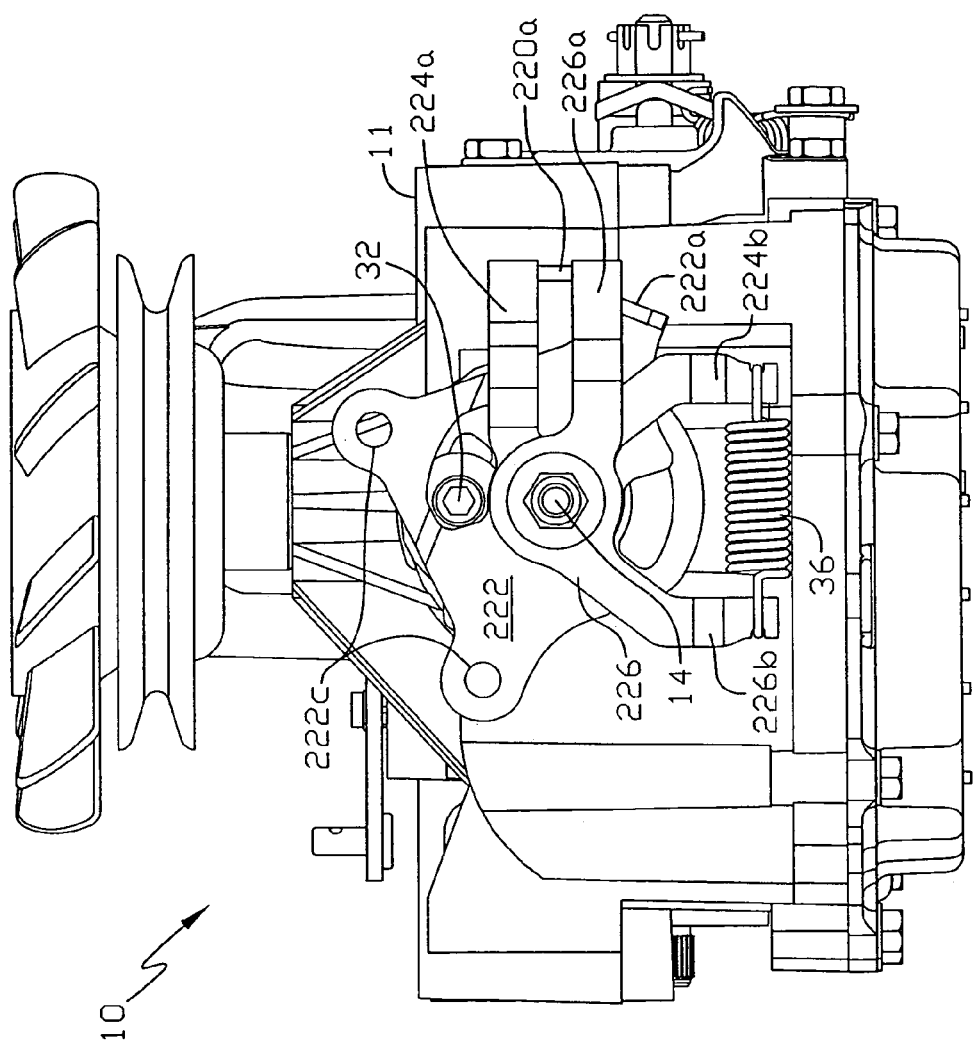
FIG. 16 is a front elevational view of the embodiment shown in FIG. 13, with the speed adjusting mechanism in the forward direction.

Another embodiment of the unidirectional return to neutral feature is shown in FIGS. 13–16, where like numerals indicate identical structure. This alternative embodiment comprises return arm 220 having projection 220a; control arm 222 having projection 222a; inner scissor return arm 224 having arm 224a; and outer scissor return arm 226 having arm 226a. A biasing means 36 is connected to arms 226b and 224b, of outer scissor return arm 226 and inner scissor return arm 224, respectively. As shown most clearly in FIGS. 14 and 16, projection 222a is shaped to pass behind and not engage arm 226a. Thus, in the forward direction as shown in FIG. 16, projection 222a passes behind arm 226a and no return force is applied. When the unit is stroked in reverse, however, as shown in FIG. 15, projection 222a engages arm 224a and a return force is created in a manner similar to that described above. Thus, in both of these alternative embodiments in FIGS. 9–16, a unidirectional return to neutral is provided. While both embodiments show the return to neutral mechanism engaged in the reverse direction and not engaged in the forward direction, this is for convenience only. It will be understood that the orientation could easily be reversed within the scope of this invention, so that the return to neutral force is provided in the forward direction but not the reverse direction.

While specific embodiments of the invention have been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalents thereof.

What is claimed is:

1. A hydraulic apparatus, comprising:
   a housing;
   a trunnion arm extending from the housing;
   a return arm rotatably mounted on the trunnion arm and attached to the housing, the return arm comprising a stop;
   a control arm attached to the trunnion arm;
   a pair of scissor return arms rotatably mounted coaxially with the return arm and the control arm; and
   a spring attached to the scissor return arms to bias the scissor return arms against the stop.

2. The hydraulic apparatus of claim 1, where the rotational orientation of the return arm is adjustable to establish a neutral position.

3. The hydraulic apparatus of claim 1, where the stop is located at an angular orientation about the trunnion arm substantially different from the angular orientation of the spring about the trunnion arm.

4. The hydraulic apparatus of claim 3, where the angular orientation of the stop to the spring about the trunnion arm is about 90°.

5. The hydraulic apparatus of claim 1, where the return arm is attached to the housing by a fastener.

6. The hydraulic apparatus of claim 5, where the control arm is spaced a distance from the return arm.

7. The hydraulic apparatus of claim 6, where the scissor return arms are rotatably mounted adjacent to the control arm on the opposite side of the control arm from the return arm.

8. The hydraulic apparatus of claim 5, where the control arm further comprises an opening that interacts with the fastener to limit the movement of the control arm.

9. The hydraulic apparatus of claim 1, where movement of the control arm in a first direction causes movement of a single scissor return arm and movement of the control arm in a second direction causes movement of both scissor return arms.

10. The hydraulic apparatus of claim 9, wherein the movement of either one or both scissor return arms is caused by the interaction of a projection formed on the control arm and a scissor return arm.

11. The hydraulic apparatus of claim 1, wherein the return arm comprises a plurality of openings that permit attachment of the return arm in at least two rotationally different orientations at least 90° apart.

12. A return to neutral mechanism for a hydraulic apparatus comprising:
   a first scissor return assembly comprising a first arm and a second arm rotationally separated from one another;
   a second scissor return assembly comprising a third arm and a fourth arm rotationally separated from one another, wherein the first arm and the third arm interact with a stop to establish a neutral position for the hydraulic apparatus; and
   a spring mounted on the second arm and the fourth arm to bias the first arm and the third arm toward the stop.

13. The return to neutral mechanism of claim 12, wherein the rotational separation of the first arm and the second arm is substantially 90° and wherein the rotational separation of the third arm and the fourth arm is substantially 90°.

14. The return to neutral mechanism of claim 12, wherein the stop is formed on a return arm that is mounted on the housing by a fastener.

15. The return to neutral mechanism of claim 14, further comprising a control arm with an opening formed therein that interacts with the fastener to limit the movement of the control arm.

16. The return to neutral mechanism of claim 14, further comprising a control arm with a projection formed thereon, where the motion of the control arm causes either one or both scissor return arms to move by interaction of the projection with at least one of the first arm and the third arm.

17. The return to neutral mechanism of claim 14, where movement of the control arm in a first direction causes one of the first arm and the third arm to move relative to the other of the first arm and third arm, and movement of the control arm in a second direction opposite the first direction causes both the first arm and the third arm to move with the control arm.

18. The return to neutral mechanism of claim 17, where one of the first arm and the third arm contacts the projection and the stop when the control arm is oriented in a neutral position, and the other of the first arm and the third arm contacts only the projection when the control arm is oriented in a neutral position.

19. The return to neutral mechanism of claim 15, wherein the return arm, the control arm, and the two scissor return arms are coaxially positioned.

20. The return to neutral mechanism of claim 19, wherein the two scissor return arms are positioned on one side of the control arm and the return arm is positioned on the opposite side of the control arm.

21. The hydraulic apparatus of claim 14, wherein the return arm comprises a plurality of openings that permit attachment of the return arm in at least two rotationally different orientations at least 90° apart.

22. A drive apparatus, comprising a first and second axle driving apparatus, each axle driving apparatus comprising a housing, a trunnion arm extending from the housing, and a return to neutral mechanism having an orientation; wherein the first return to neutral mechanism on the first axle driving apparatus may be oriented in a plurality of directions and the second return to neutral mechanism on the second axle driving apparatus may be oriented in a plurality of directions.

23. The drive apparatus of claim 22, wherein the orientation of the first return to neutral mechanism and the second return to neutral mechanism is substantially similar.

24. The drive apparatus of claim 22, wherein the orientation of the first return to neutral mechanism and the second return to neutral mechanism is substantially dissimilar.

25. The drive apparatus of claim 22, wherein the orientation of the first return to neutral mechanism and the second return to neutral mechanism is generally 180° different.

* * * * *

UNITED STATES PATENT AND TRADEMARK OFFICE
CERTIFICATE OF CORRECTION

PATENT NO. : 6,968,687 B1  
APPLICATION NO. : 10/897241  
DATED : November 29, 2005  
INVENTOR(S) : Herb Poplawski et al.

Page 1 of 1

It is certified that error appears in the above-identified patent and that said Letters Patent is hereby corrected as shown below:

On the title page item (75) should read:

Inventors: Herb Poplawski, Racine, WI (US);
Michael W. Taylor, Sullivan, IL (US);
Ryan S. Buescher, Neoga, IL (US);
Jeffrey A. Wilson, Mattoon, IL (US);
Neil Brandenburg, Neoga, IL (US)

Signed and Sealed this
Twentieth Day of November, 2012

David J. Kappos
*Director of the United States Patent and Trademark Office*